Figure 1:
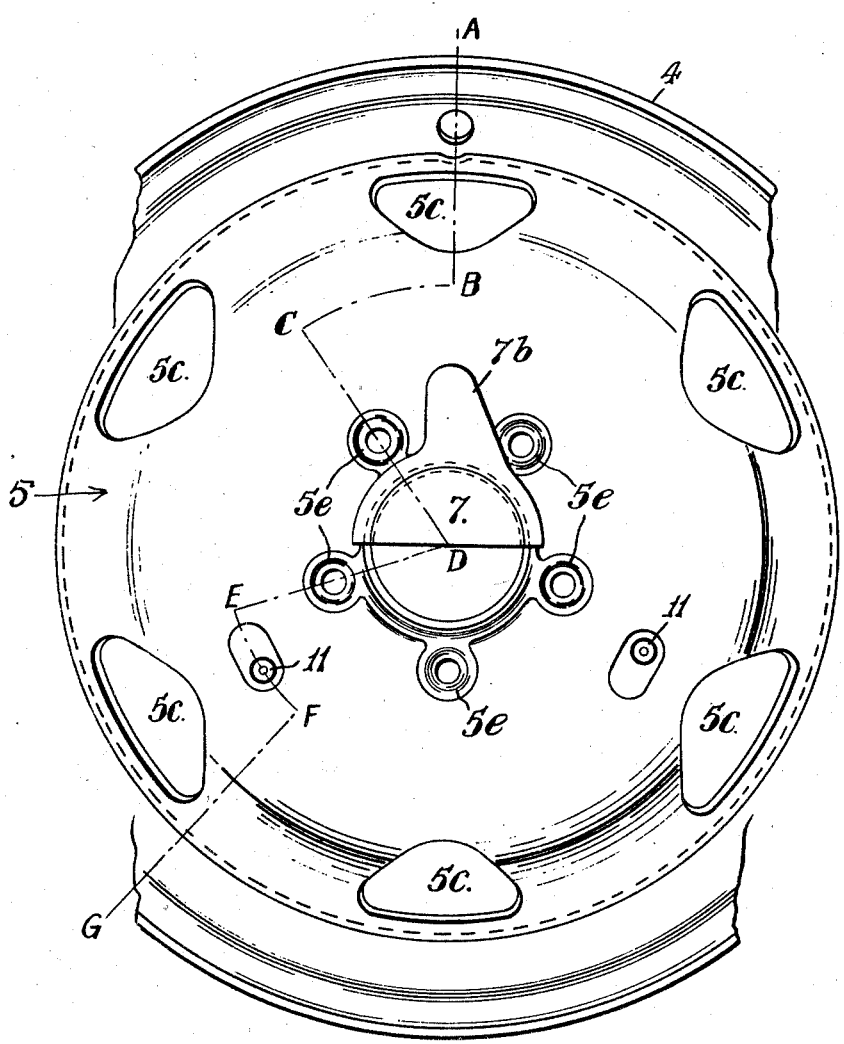

May 15, 1951 P. B. CHATTERTON 2,552,936
DETACHABLE WHEEL FOR ROAD VEHICLES

Filed Jan. 18, 1947 2 Sheets-Sheet 1

Inventor
Percy Barnes Chatterton
by Benj. T. Rauber
his Attorney

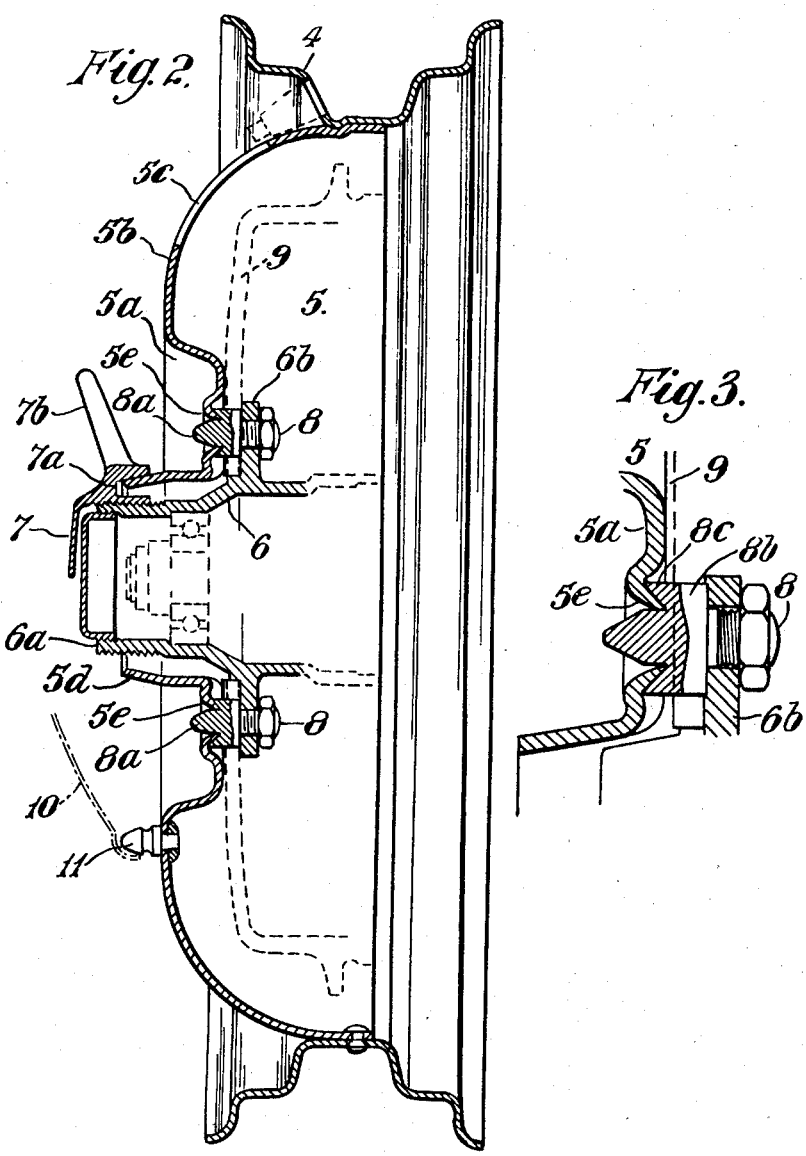

Patented May 15, 1951

2,552,936

UNITED STATES PATENT OFFICE 2,552,936

DETACHABLE WHEEL FOR ROAD VEHICLES

Percy Barnes Chatterton, Kenilworth, England, assignor to Dunlop Rubber Company Limited, London County, England, a British company Application January 18, 1947, Serial No. 722,878
In Great Britain February 12, 1946

2 Claims. (Cl. 301—9)

My invention has reference to improvements relating to detachable wheels for road vehicles and is concerned particularly with means for mounting detachable wheels for road vehicles of the kind in which a wheel is adapted to be secured to a hub by means of a single nut which is engaged with an outwardly projecting screw threaded portion of the hub and in which the drive is transmitted to the wheel by means of studs which are fixed to a flange adjacent to the hub and which studs engage within holes in the central portion of a wheel.

With detachable wheels of the aforesaid kind it is essential that there should be a certain amount of clearance between the driving studs and the holes in the central portion of the wheel, partly to ensure interchangeability of the wheels and partly to reduce the effort required to assemble or detach a wheel. This clearance, however, makes possible a relative oscillatory movement between wheel nave and hub flange, and under operating conditions it is not always possible to ensure that the frictional resistance between the two parts due to the tightening of the nut on the hub will suffice to prevent such oscillations. There thus arises in consequence rapid wear of the driving studs and of the walls of the holes through which the studs project, thus increasing the oscillatory movement and the rate at which wear takes place.

The present invention has for its object to provide an improved means for mounting detachable wheels of the kind hereinbefore referred to which ensures that there shall be no oscillatory movement between a detachable wheel of the said kind and an associated hub flange.

According to the invention the improved means for mounting detachable wheels for road vehicles of the kind hereinbefore referred to is characterised in that some or all of the driving studs have associated therewith a shaped portion adapted to co-operate in mating relationship with complementary shaped counterpart portions bounding the holes in the wheel through which the driving studs are required to project so that when this relationship has been established and the nut tightened up oscillatory movement of a wheel relatively to a hub flange is prevented.

The invention will now be described with particular reference to the accompanying drawings wherein:

Figure 1 is a fragmentary front view of a detachable wheel constructed in accordance with the invention, with parts broken away in the lower half of the figure for the sake of clearness.

Figure 2 is a side view in section of the wheel illustrated in Figure 1 the section for the upper part of the figure being taken on the line ABCD of Figure 1 and the section of the lower part of the figure taken on the line DEFG of Figure 1 and Figure 3 is a fragmentary view partly in elevation and partly in section and on an enlarged scale of the driving studs and complementary parts as utilised in the construction illustrated in Figures 1 and 2.

According to the embodiment of the invention illustrated the base of a wheel rim 4 of a detachable wheel is riveted or welded to an outer peripheral flange portion of an annular sheet metal pressing 5 which constitutes the body of the wheel, said pressing 5 being formed with an inwardly recessed central section $5a$ which is bounded by an outwardly dished portion $5b$ having therein holes $5c$ for lightening purposes in known manner.

The central portion of the wheel body pressing 5 is provided with an outwardly projecting sleeve $5d$ adapted to fit around an externally screw threaded portion $6a$ of the hub 6 when a wheel is passed thereon, see Figure 2. This screw threaded portion $6a$ of the hub 6 is adapted to be engaged by a nut 7 of known kind having an annular recess $7a$ for the accommodation of the outer end portion of the said sleeve $5d$ when the nut 7 is screwed on to the hub 6, said nut 7 also incorporating oppositely projecting arms $7b$ for facilitating screwing and unscrewing.

The inwardly recessed central section $5a$ of the wheel body pressing 5 is provided with a plurality of equidistantly spaced inwardly dished parts $5e$ of a substantially frusto-conical shape each of which has a hole therein and these holes are adapted to co-operate with the outwardly projecting conical end portions $8a$ of a corresponding number of equidistantly spaced driving studs 8 which are non-rotatably secured to a hub flange $6b$ associated in fixed relationship with the hub 6. The base portions $8b$ of the driving studs 8 which are of greater diameter than the forwardly projecting conical end portions $8a$ which actually project through the holes aforesaid have formed therein recesses $8c$ which are the counterpart of the inwardly dished substantially frusto-conical portions $5e$ bounding the holes in the inwardly recessed central section $5a$ of the wheel.

Thus when a detachable wheel has been passed over a hub 6 so that the conical ends $8a$ of the driving studs 8 project through the holes in the inwardly recessed central section 5a of the wheel body pressing 5 and the single nut 7 has been screwed on to the screw threaded portion 6a of the hub 6 the inwardly dished substantially frusto-conical parts 5e surrounding the said holes engage in self aligning mating relationship with the counterpart seating recesses 8c formed in the bases 8b of the driving studs 8 so that relative oscillatory movement between a wheel and a hub flange is rendered impossible when the nut 7 is tightened up.

Preferably the length of the enlarged base portions 8a of the driving studs 8 and the depth of the seating recesses 8c therein are such that when a wheel is correctly secured on a hub 6 a small clearance exists between the plane containing the innermost surfaces of the inwardly recessed central section 5a of the wheel body pressing and the adjacent surface of the usual brake drum 9 (see Figure 2) which as a general practice is secured to a hub flange 6b by means of countersunk screws, not shown, interspaced with the driving studs 8, the making of a provision for such a clearance ensuring that there shall be obtained always a full measure of seating engagement between the dished parts 5e surrounding the holes in the central portion 5a of the wheel body pressing 5 and the recessed seatings 8c associated with the driving studs 8.

If desired and as is indicated in dotted lines in Figure 2 the nut 7 and adjacent parts of the wheel and hub may be covered by a cap 10 which is sprung on to studs 11 after a nut 7 has been tightened.

Having described my invention, what I claim is:

1. A wheel assembly which comprises a hub having a screw threaded portion, a nut screwed onto said portion, a wheel to fit over said portion and be secured by said nut, said wheel having a plurality of inwardly dished parts of substantially frusto-conical shape each being open at the smaller base of the frusto-conical shape and driving means fixed to the hub, one for each said inwardly dished part of said wheel and flaring to receive and fit said dished part of said wheel and having a projection integral therewith and extending through said open end of said dished part of said wheel.

2. The wheel assembly of claim 1 in which said projection is of conical formation and forming with said base an annular recess for the reception of the inwardly dished parts of said wheel.

PERCY BARNES CHATTERTON.

REFERENCES CITED

The following references are of record in the file of this patent:

UNITED STATES PATENTS

| Number | Name | Date |
|---|---|---|
| 1,846,079 | Bellamore | Feb. 23, 1932 |
| 2,047,895 | Sinclair | July 14, 1936 |
| 2,112,615 | Zerk | Mar. 29, 1938 |

FOREIGN PATENTS

| Number | Country | Date |
|---|---|---|
| 600,614 | France | Feb. 23, 1932 |